Feb. 12, 1946.  R. V. TRADER  2,394,826
TAIL SKID CONNECTION FOR AIRPLANES
Filed July 12, 1944
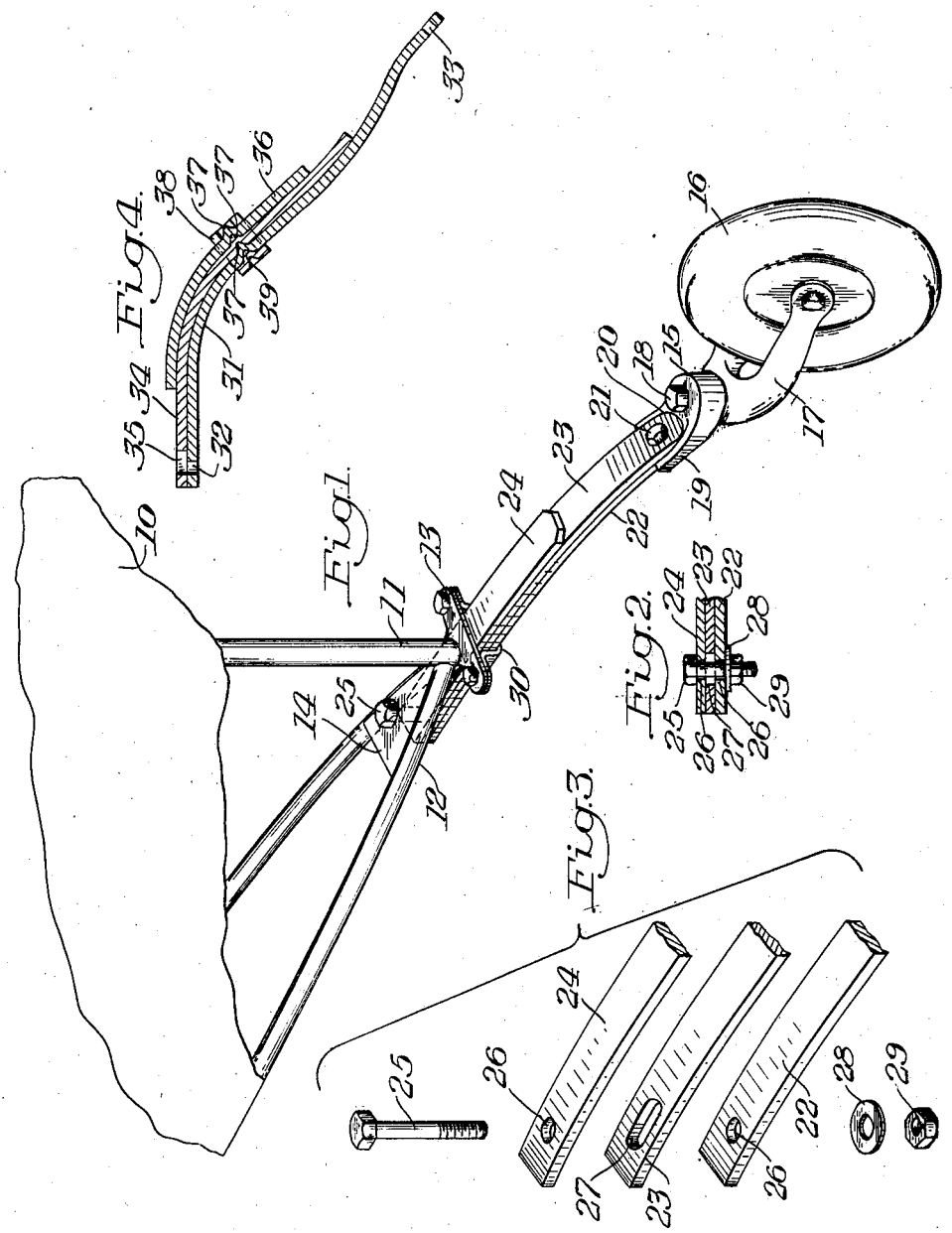
INVENTOR.
Russell V. Trader.
BY Edward A. Lawrence,
his attorney.

Patented Feb. 12, 1946

2,394,826

UNITED STATES PATENT OFFICE 2,394,826

TAIL SKID CONNECTION FOR AIRPLANES

Russell V. Trader, Mifflin Township, Allegheny County, Pa.

Application July 12, 1944, Serial No. 544,513

5 Claims. (Cl. 244—109)

My invention consists in an improvement in attachment to an airplane of a skid wheel or shoe.

It is usual to attach the tail skid wheel to the longerons of the fuselage by means of a steel leaf spring, one end of which is rigidly bolted to a gusset plate welded in the angle of the converging longeron tubes and the other end is likewise bolted to the bracket assembly of the skid wheel. In instances where a skid shoe is employed, instead of a skid wheel, the rear end of the spring is bolted to the shoe.

In the case of the arrangement above referred to when the wheel casters to one side a twisting force is imposed which frequently breaks the spring; again, the wheel when it is brought into contact with the ground in landing the airplane, or when taxiing along the ground, is likely to bounce up and down due to the flexing of the spring.

In my invention I provide a multiple leaf spring connection between the fuselage and the skid wheel assemblage and provide therein means to dampen the flexing of the spring connection to avoid bouncing of the skid wheel in landing or taxiing over rough ground.

Further I provide means whereby in castering the wheel the twisting action exerted on the spring connection is effectually counteracted and the axis of the castering movements is maintained vertical.

Other advantages and novel features of construction and of arrangement of parts will appear from the following description.

In the accompanying drawing wherein I illustrate a practical embodiment of the present invention, Fig. 1 is a broken perspective view showing the multiple spring connection between the tail of an airplane fuselage and the skid wheel.

Fig. 2 is a detail in longitudinal section showing the attachment of the multiple spring connection to the rear of the longeron of the fuselage.

Fig. 3 is an exploded perspective view showing the front portions of the spring leaves and the connecting bolt, washer and nut by means of which the assembled leaves are attached to the gusset plate of the longerons.

Fig. 4 is a longitudinal section of a modified form of my improved spring connection.

Referring to the drawing, 10 indicates the tail portion of an airplane fuselage, 11 the tail post, 12 the converging longeron tubes and 13 the base plate of the tail post. The angle between the converging tubes 12 is provided with an interposed gusset plate 14 welded in place to strengthen the structure and to provide means for attaching the front end of the skid wheel spring assembly to the fuselage. The base plate 13 is rigidly attached to the post 11 and the longerons 12.

15 indicates the swivel bushing of the skid wheel assembly, the skid wheel being indicated at 16. The wheel 16 is mounted in the usual manner in the fork 17 depending from the arbor 18 which is journaled in the bushing 15.

The bushing 15 is provided with the usual bracket 19 provided with the upwardly open seat 20 which receives the front end of the spring assembly and to and in which the assembly is tightly attached by the bolt 21.

The spring assembly is of multiple character, comprising a plurality of leaf springs, preferably three in number, although but a pair of springs or a greater number than three may be employed.

The leaf springs shown in the drawing are indicated at 22, 23 and 24. The rear ends of the springs 22 and 23 are received into the seat 20 of the bracket 19 and are held fixedly in the seat by the bolt 21 and the side walls and floor of the seat.

The front ends of the spring leaves 22, 23 and 24 are secured by the bolt 25 to the under side of the gusset plate 14, said bolt extending down through holes in the gusset plate and in the three leaves.

The holes 26 in the upper leaf 24 and in the lower leaf 22 are round and of the proper diameter to receive the bolt and prevent material longitudinal movement of the leaves 22 and 24 relative to the gusset plate 14.

The bolt hole 27 in the leaf 23 is elongated longitudinally of the leaf so that the front end portion of the leaf 23 in flexing may slide longitudinally of the leaves 22 and 24, the washer 28 and the nut 29 being tightened on the protruding lower end of the bolt to a degree which will hold the leaves in frictional surface contact while permitting relative movement of the leaf 23.

30 indicates an inverted U-shaped spring clip clasping the leaves 22, 23 and 24 from below and bolted at its upwardly extending ends to the base plate 13 to prevent lateral movement between the leaves in the presence of a twisting force and also to prevent material separation of the leaves.

The upper leaf 24 preferably is of less length than the leaves 22 and 23 and extends from the front anchorage of the leaves toward the bracket 19 but stops considerably short of the same. It thus serves to distribute the flexing of the leaves 22 and 23 along substantially their entire length.

It is recognized that the strength of a steel spring leaf arises from its rolled exterior surface of tempered steel. The interior metal of the leaf is composed of softer steel which provides for flexibility, but the interior metal is not highly stressed in use.

Thus by my employment of at least two spring leaves to connect the fuselage with the skid wheel assembly I provide an increased amount of tempered surface steel to sustain the same weight, and this is highly important and advantageous since the weight imposed upon the skid wheel assemblage is an important factor in the lever movement which tends to upset the balance of the airplane due to the relation of its center of gravity to the center of wing lift.

In the provision for a frictional sliding movement between the leaves which connect the skid wheel assembly to the fuselage adjacent their attachment to the latter, the resultant sliding friction between leaves functions to effectually dampen the flexing of the leaves, and thus prevents the wheel from springing up and down excessively. This is a great advantage in setting the airplane on the ground in landing or in taxiing over rough ground.

In the drawing I have shown the slotted bolt hole 27 provided in the intermediate leaf, and this is greatly to be preferred because the upper and lower leaves thus enclose the slotted hole and prevent the entrance of dirt and water. By placing such slotted hole at the greatest elevation feasible this advantage is magnified. If desired the front end of the spring assembly may be enclosed within the fuselage, in which case it is feasible to provide the slotted bolt hole in the leaf 22.

In Fig. 4 I illustrate a modification of my improved spring connection wherein the leaf 31 is arranged to be bolted fixedly at its ends to the fuselage and to the skid mounting by means of bolts extending through the circular holes 32 and 33 adjacent the ends of the leaf, while the leaf 34 is secured to the fuselage by means of a longitudinally slotted hole 35 through which extends the bolt which engages the hole 32 in the leaf 31, so as to have a limited sliding movement when the spring connection is flexed.

The leaf 34 is of the proper length to extend more than half the length of the leaf 31 but not the full length thereof, and is preferably superimposed thereon, as shown.

36 indicates a short leaf superimposed on the leaf 34 intermediate of the ends of the latter, and the metal of the three leaves is struck upwardly to form conical extrusions 37 which fit into each other and interlock to hold the rear end portion of the leaf 34 against movement relative to the leaf 31. A split keeper 38 clamps the three leaves together at the zone of interlocking to hold them in surface contact. Preferably the ends of the split keeper are notched to loosely surround the extruded portion 37 of the leaf 36. Also an extrusion 39 is formed in the lower bridge portion of the keeper 38 which fits into the cavity of the extrusion of the leaf 31. Thus the keeper not only clamps the leaves together but is itself held from sliding along the leaves. In this form of my spring connection there is preferably provided a reverse longitudinal curvature, substantially as shown in the view, to provide proper flexing.

Thus it is evident in the use of my invention that when the skid wheel casters to either side, and a twisting force is effective on the tail skid, due to the application of the load a few inches more or less to one side of the spring leaves, the spring assembly has a parallel lever motion which resists the twisting force and insures the flexing of the spring assembly in a true up and down direction.

Without this resistance to the twisting force the axis upon which the wheel may caster is moved out of the vertical and it would be necessary to relieve the load on the wheel before it could be returned to its normal alignment with the axis of the airplane or could be caused to caster in the reverse direction. It is of course highly important for the skid wheel to caster freely.

Again in landing, or when the plane is taxiing over a rough ground surface, this tendency to twist the spring connection along its longitudinal axis appears but it is overcome by my present invention.

I claim:

1. A spring construction, for connecting the tail skid of an airplane to the fuselage thereof, said fuselage being provided with a spring clamping bolt, consisting of a pair of parallel spring leaves in frictional surface contact and fixedly connected at one end to the skid mounting, the other end of one of the leaves being provided with a bolt hole in which the fuselage bolt fits snugly and the corresponding end of the second leaf being provided with a bolt hole elongated longitudinally of the second leaf to receive the fuselage bolt and permit a limited longitudinal sliding movement of the second leaf, and means for holding the leaves in engagement with the fuselage bolt.

2. A spring construction for connecting the tail skid of an airplane to the fuselage thereof, said fuselage being provided with a spring clamping bolt, consisting of a pair of parallel spring leaves in frictional surface contact, one end of one of the leaves being fixedly attached to the skid mounting and its other end being provided with a bolt hole in which the fuselage bolt fits snugly and one end of the second leaf being rigidly attached to the first leaf adjacent the skid mounting and the other end of the second leaf being provided with a bolt-hole elongated longitudinally of the second leaf to receive the fuselage bolt and permit a limited longitudinal sliding movement of the second leaf, and means for holding the leaves in engagement with the fuselage bolt.

3. In a spring construction for connecting the tail skid bracket member to the fuselage member of an airplane, the combination of a pair of parallel spring leaves in continuous surface contact, means defining a snugly fitting bolt hole in each of the leaves adjacent one of the ends thereof, a bolt passing through said holes to fixedly attach both leaves to one of the members, means defining a snugly fitting bolt hole in the other end of one of said leaves, means defining an elongated bolt hole in the corresponding end of the other of said leaves, the center of the elongated bolt hole arranged to match the axis of the corresponding bolt hole in the first spring when the springs are unflexed, and a bolt passing through said matched openings to fixedly attach said springs to the other member.

4. The structure of claim 3 characterized in that the first mentioned leaf lies below the second mentioned leaf.

5. The structure of claim 3 characterized in that the end of the second mentioned leaf having the elongated opening is attached to the fuselage member.

RUSSELL V. TRADER.